July 15, 1924. 1,501,392
E. R. BURTNETT ET AL
VALVE GEAR FOR INTERNAL COMBUSTION ENGINES
Filed May 11, 1920 5 Sheets-Sheet 1

Patented July 15, 1924.

1,501,392

UNITED STATES PATENT OFFICE.

EVERETT R. BURTNETT AND TITUS E. BERRY, OF LOS ANGELES, CALIFORNIA; SAID BURTNETT ASSIGNOR TO SAID BERRY.

VALVE GEAR FOR INTERNAL-COMBUSTION ENGINES.

Application filed May 11, 1920. Serial No. 380,547.

*To all whom it may concern:*

Be it known that we, EVERETT R. BURTNETT and TITUS E. BERRY, citizens of the United States, residing at Los Angeles, in the county of Los Angeles and State of California, have invented new and useful Improvements in Valve Gears for Internal-Combustion Engines, of which the following is a specification.

This invention relates to the valve gear for an internal combustion engine of the type having eight cylinders arranged around the drive shaft and parallel thereto with an angular crank and stroke plate transmission between the pistons in the cylinders and the drive shaft.

It is an object of the invention to provide a valve construction providing a six stroke cycle of operation, the valves for half of the cylinders of the engine being arranged to be actuated by one cam mechanism controlled by the drive shaft of the engine, and the valves for the remainder of the cylinders of the engine being controlled by another cam mechanism actuated by the drive shaft of the engine.

Further objects of the invention will be readily understood from the following description of the accompanying drawings, in which—

Figure 1:
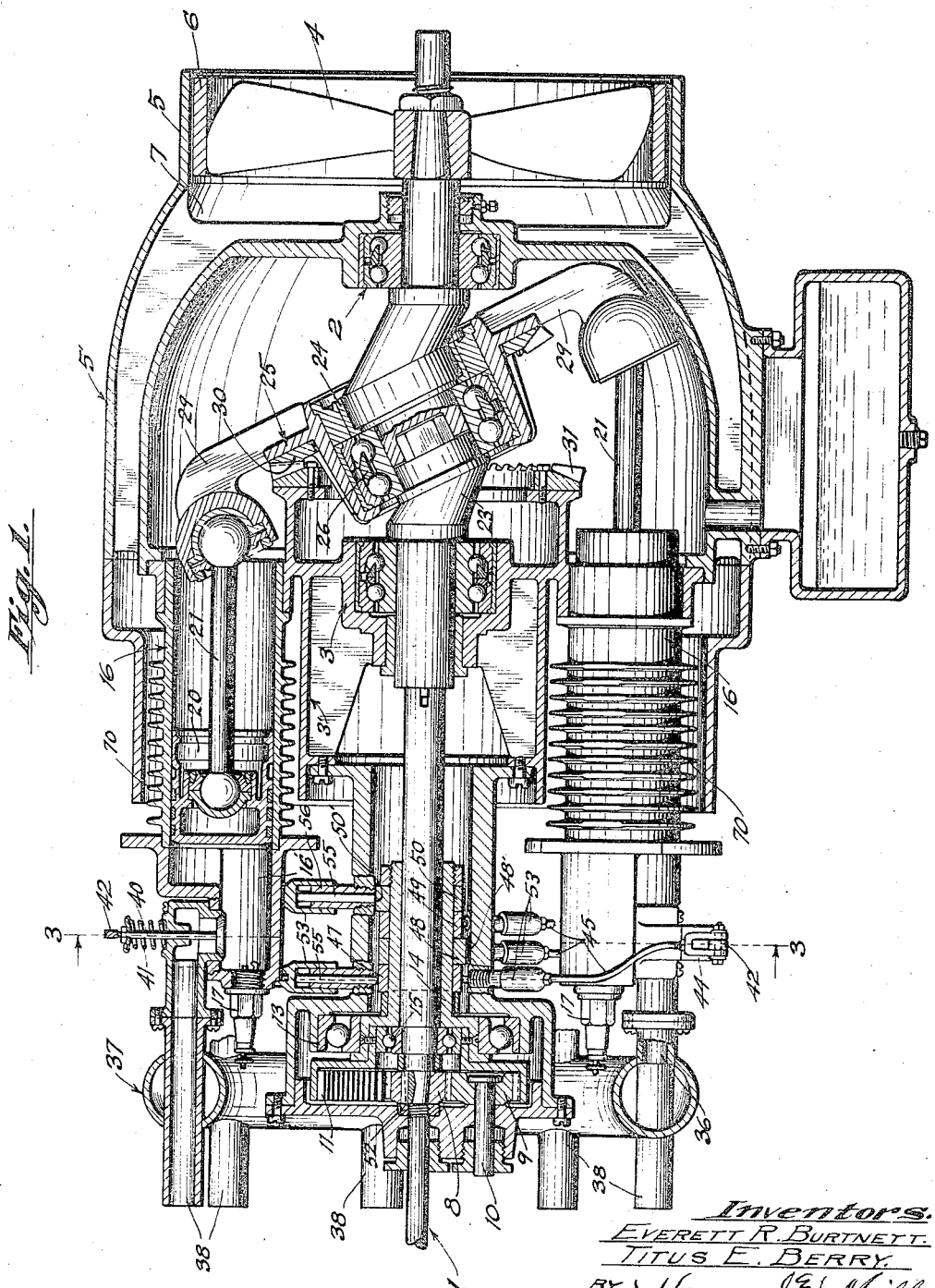
Figure 1 is a longitudinal section through an internal combustion engine having the improved valve gear.
Figure 2:
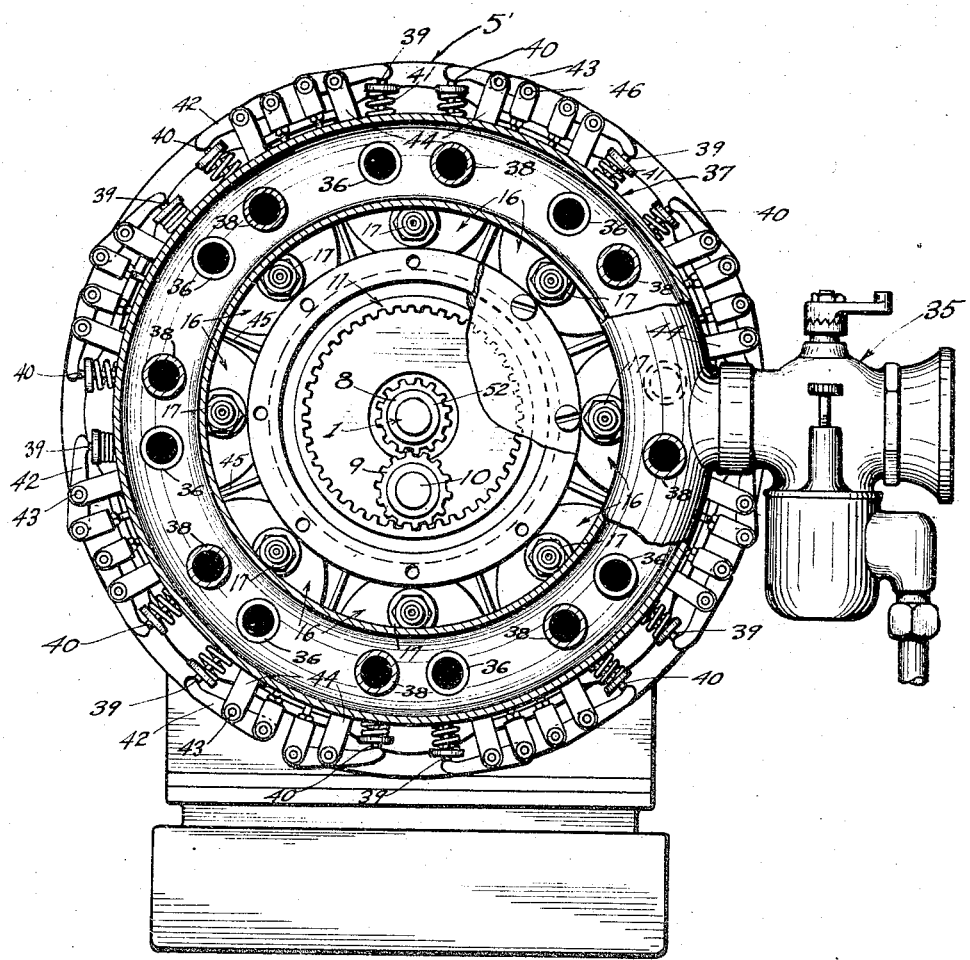
Fig. 2 is an end view of the same.

The drive shaft 1 of the engine is mounted in bearings 2 and 3 of a suitable supporting housing 3', and a fan 4 is mounted upon the end of the shaft 1 within a casing 5 forming a continuation of a jacket 5' spaced from and surrounding the main housing 3' and the engine cylinders. A heavy rim 6 is provided at the outer ends of the blades of the fan so that the fan and rim serve as a fly wheel. The fan draws fresh air past the walls of the cylinder and into the space 7 between the engine housing and the jacket 5', for externally cooling the engine.

The cam mechanism for actuating the cylinder valves is arranged at the opposite end of the drive shaft 1 beyond the engine cylinders. This mechanism comprises a pinion 8 fast upon the drive shaft and meshing with an idler pinion 9 journaled upon a shaft 10 supported by the engine frame. An internal gear 11 surrounds pinions 8 and 9 and meshes with pinion 9 so that the internal gear is rotated in the opposite direction to the direction of rotation of the drive shaft 1. The ratio of this gearing is 3 to 1 so that the internal gear 11 makes three revolutions to one revolution of the drive shaft 1.

The internal gear 11 is supported by the engine casing by a bearing 13 and a ball bearing 15 is provided between the drive shaft 1 and the internal gear 11. A sleeve 14 is secured to the internal gear and is loosely received over the drive shaft 1. This sleeve is adapted to carry the cams for actuating the valves of the cylinders.

Figure 3:
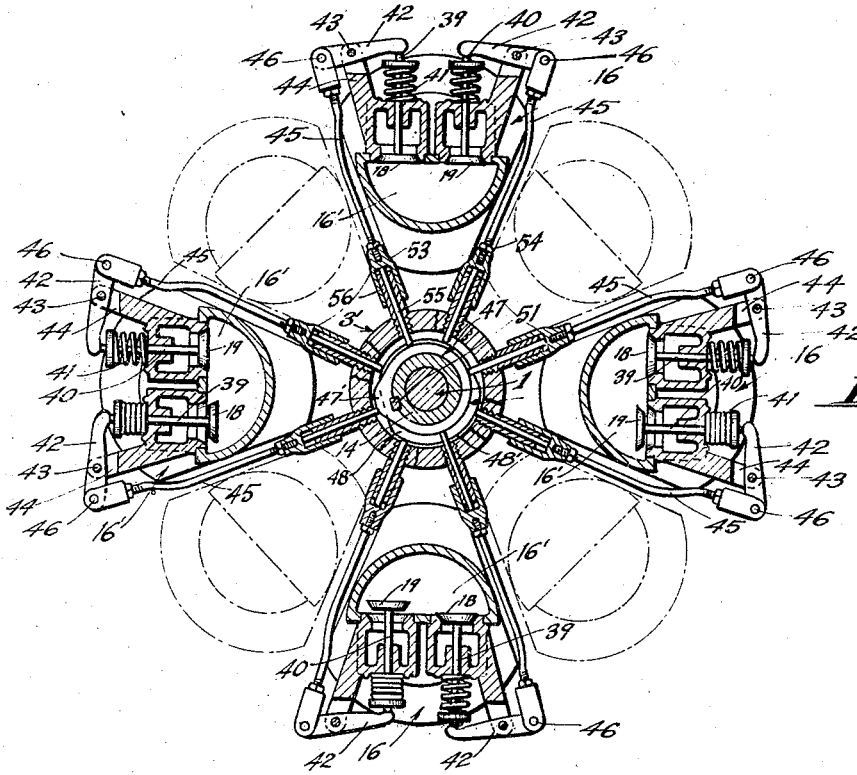
Fig. 3 is a transverse section on the line 3—3 of Fig. 1 showing only the A series of cylinders and their valves and actuating cams.
Figure 4:
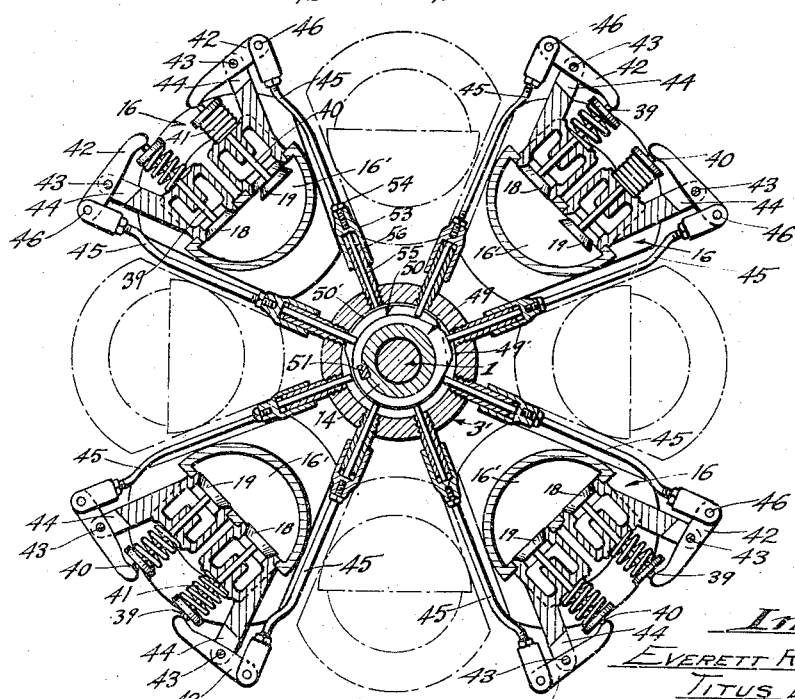
Fig. 4 is a similar view showing only the B series of cylinders and their valves and actuating cams.
Figure 5:
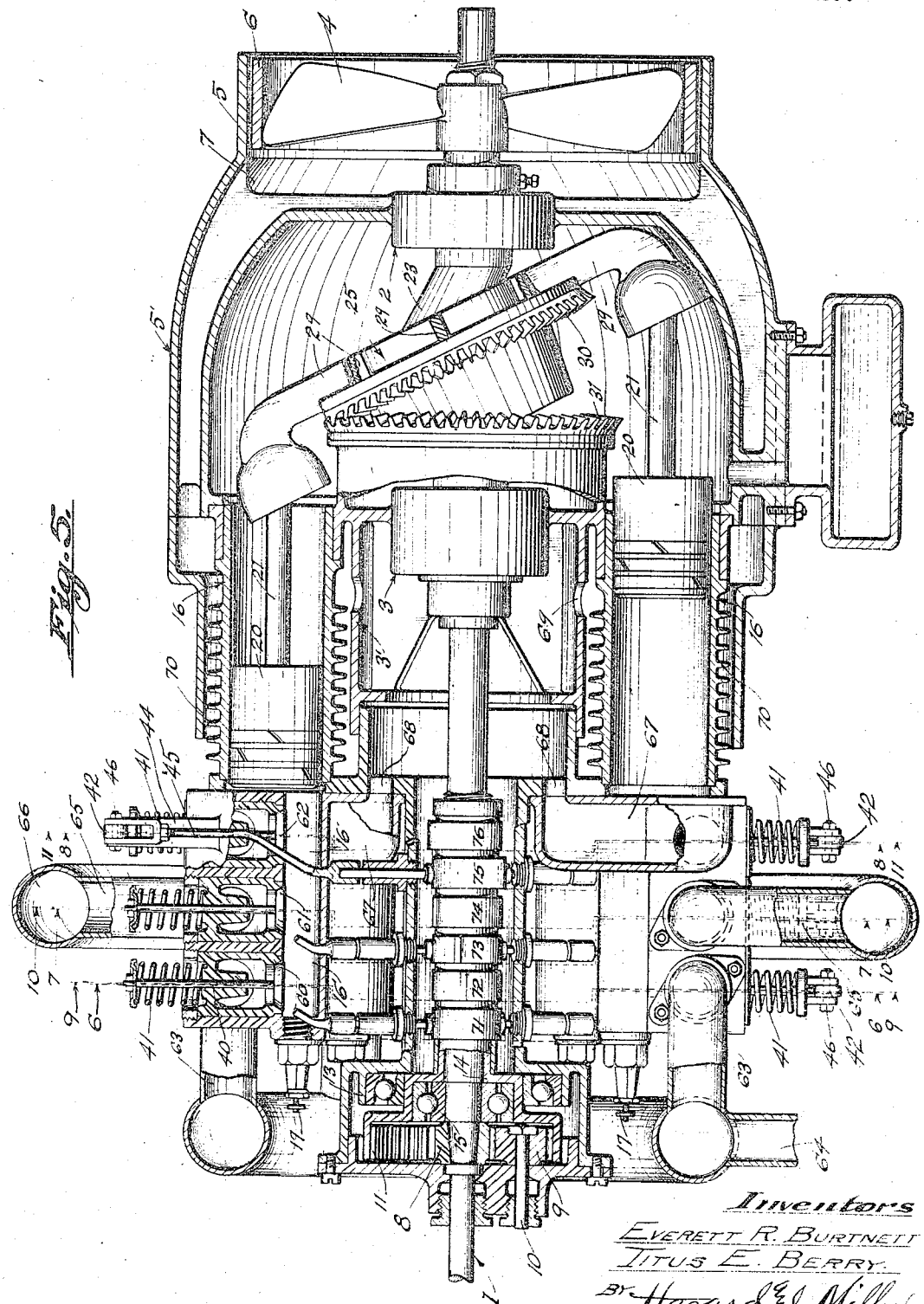
Fig. 5 is a longitudinal section similar to Fig. 1 but showing a modified form of valves and valve gearing.
Figure 6:
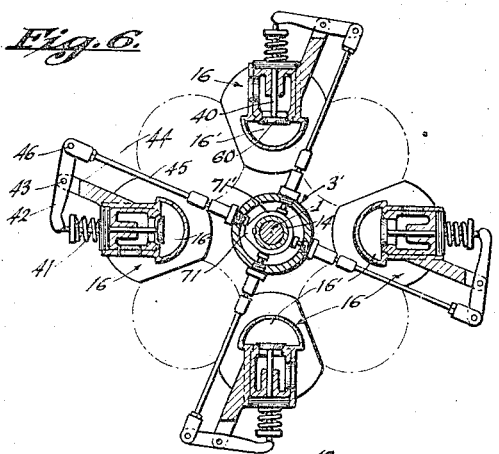
Fig. 6 is a transverse section on the line 6—6 of Fig. 5 showing only the A series of cylinders and their valve gearing.
Figure 9:
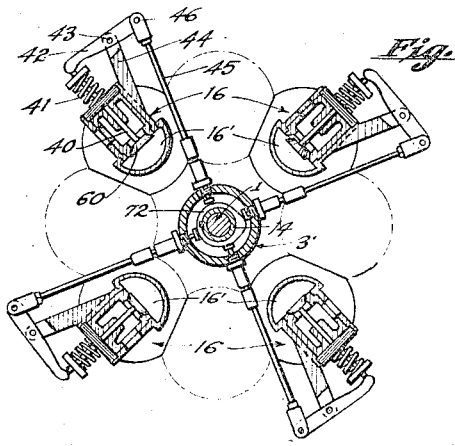
Fig. 9 is a transverse section on the line 9—9 of Fig. 5 showing only the B series of cylinders and their valves and valve gearing.
Figure 7:
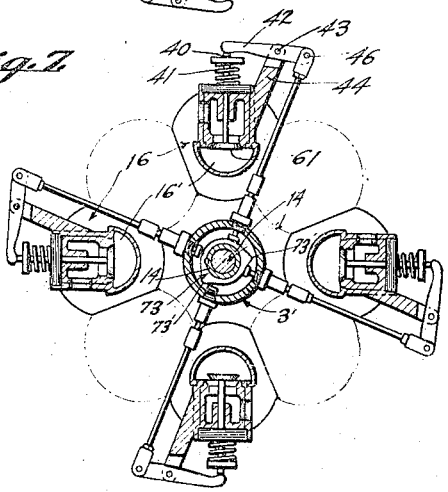
Fig. 7 is a similar view on the line 7—7 of Fig. 5.
Figure 10:
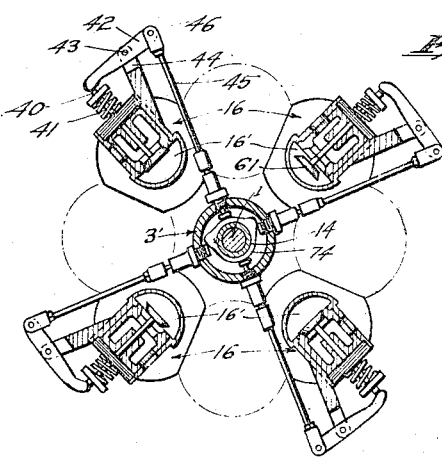
Fig. 10 is a similar view on the line 10—10 of Fig. 5.
Figure 8:
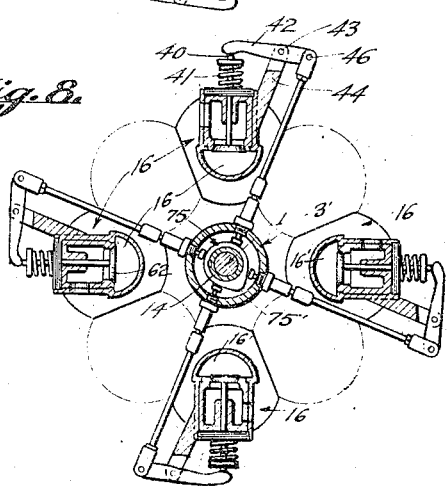
Fig. 8 is a similar view on the line 8—8 of Fig. 5.
Figure 11:
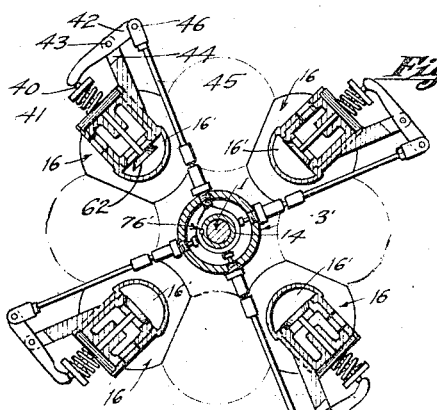
Fig. 11 is a similar view on the line 11—11 of Fig. 5.

Eight combustion cylinders 16 are supported by the main housing of the engine, said cylinders being evenly spaced radially and concentrically around the drive shaft 1, and a spark plug 17 is provided in an explosion chamber 16' at the end of each of these cylinders. The valves for the respective cylinders extend radially from explosion chambers 16', each cylinder being provided with two valves 18 and 19. The valves of all of the cylinders are, preferably, arranged in the same plane transversely to the drive shaft 1, and the valves of one set of alternate cylinders are actuated by one set of cams, as shown in Fig. 3, and the valve of the other set of alternate cylinders are actuated by a second set of cams, as shown in Fig. 4.

In order to distinguish the two sets of valves and cylinders, we have called the first set the A series and the second set the B series.

Each of the eight cylinders is provided with a piston 20 and a piston rod 21, the strokes of the pistons and piston rods being parallel with the drive shaft 1. The drive shaft 1 is provided with an angular crank 23 between the bearings 2 and 3, the annular crank having an axis diagonal of the axis of the drive shaft. A sleeve 24 is fixed upon the angular crank 23, the periphery of the sleeve being concentric to the crank 23 and inclined to the drive shaft 1, and a stroke plate 25 is received over sleeve 24 with a ball bearing 26 between said sleeve and stroke plate. Arms 29 extend radially from the stroke plate 25 and the outer ends of the piston rods 21 are connected to the outer ends of these arms 29 so that as the pistons reciprocate the shaft 1 will rotate. A bevel gear 30 is formed upon the periphery of the stroke plate 25 and meshes with the bevel gear rack 31 fixed upon the engine casing, said gear 30 serving to hold the stroke plate 25 against rotation.

The valve 18 of a cylinder of the engine is the inlet valve for the combustible mixture supplied from a usual carburetor 35. The valve casings of the valves 18 each communicate with a pipe 36 which extends parallel to the axis of the engine and opens into an annular header 37 to which the carburetor 35 is attached. The valves 19 of the respective cylinders are the exhaust valves and also the valves through which fresh air is drawn into and discharged from the respective cylinders during the last two strokes of the six strokes comprising a cycle of operation. The valve casings of these valves are shown as communicating with pipes 38 leading to the atmosphere and extending parallel to the axis of the engine. These pipes, preferably, pass through the annular header 37, as clearly shown in Fig. 1, so that the combustible mixture being supplied to the cylinders through the header 37 will be heated by the exhaust gases passing through the pipes 38.

The valves 18 and 19 are, preferably, usual poppet valves having the valve stems 39 and 40 shown as extending at right angles to the pistons 20 and arranged to be depressed against the tension of springs 41 to open the valves, the springs tending to normally close said valves. The means for actuating the valve stems may consist of a lever 42 for each valve stem, the lever being pivoted at 43 to a bracket 44 projecting from the respective valve casings. The opposite end of lever 42 is pivoted to an actuating rod 45, as shown at 46, this actuating rod being arranged to be moved by the cam mechanism carried by sleeve 14. The actuating rods 45 for the valves 18 of the A series of cylinders are adapted to be actuated by one cam upon sleeve 14, and the actuating rods for the valves 19 of this series are actuated by a second cam upon sleeve 14. In similar manner the actuating rods for valves 18 and 19 of the B series of cylinders are actuated respectively by a third and fourth cam upon sleeve 14. The four cams thus mentioned are shown at 47, 48, 49 and 50 respectively. These cams are shown as keyed upon sleeve 14 by a key 51, the cams being, preferably, held against longitudinal movement along the key by a collar 52 threaded upon the end of sleeve 14.

The cams 47 and 49 for the intake valves 18 are provided with cam surfaces 47' and 49' respectively. These cam surfaces are of a length sufficient to cause opening of valves 18 for approximately one-sixth of a complete rotation of the cams. In other words, during the six strokes of the piston of a cylinder forming a complete cycle of operation the valves 18 will be opened only during one of these strokes. After the intake valve for a cylinder has been opened by this actuating cam to draw a charge of the combustible mixture into the cylinder, the valve will close and upon the next stroke of the piston of the cylinder the charge will be compressed ready for firing at the next downward stroke of the piston. During the remaining three strokes of a cycle of operation for forcing the exploded charge from the cylinder and for then drawing a charge of fresh air into the cylinder and then discharging the same the intake valve remains closed.

The cams 48 and 50 controlling the valves 19 are provided with cam surfaces 48' and 50' which extend approximately around one-half of the cams. The cams 48 and 50 are so arranged with respect to cams 47 and 49 that after the intake stroke during which valves 19 will remain closed, for the next two strokes of a cycle of operation these valves will remain closed, thus forming the half of the cycle of operation in which valves 19 are not actuated by cam surfaces 48' and 50'. The two strokes of a cycle of operation following the intake stroke are the compression stroke and the firing stroke respectively, and it is at the end of the firing stroke that cam surfaces 48' and 50' will open valves 19 for the remaining three strokes of a cycle of operation.

During the first of the strokes during which valve 19 is open the burnt charge within the cylinder will be exhausted therefrom to the atmosphere through pipes 38, and during the following suction stroke within the cylinder fresh air will be drawn through pipe 38 from the atmosphere into the engine cylinder for cooling the interior of said cylinder. This charge of cooling air is exhausted from the engine cylinder during the last stroke of the three during which valve 19 is open which will be the sixth stroke of the cycle of operation.

The cam surfaces of the cams of the A series of cylinders are, preferably, arranged diametrically opposite to the cam surfaces of the cams of the B series of cylinders, as clearly shown in Figs. 3 and 4, so that the firing strokes of the cylinders will be alternate in cylinders of the A and B series and will be successively at approximately diametrically opposite sides of the drive shaft of the engine.

The valves 18 and 19 of the engine cylinders being in one plane transversely to the axis of the drive shaft 1 and the actuating cams for these valves extending lengthwise of said drive shaft, it is necessary that the actuating rods 45 of the cams be suitably off-set, as clearly shown in Figs. 3 and 4, in order that the actuating rods may be positioned above their respective cams. The actuating rods are shown as terminating in nipples 53 adjustable relative to the actuating rods by a usual nut and bolt construction 54, and the pins 55 arranged to rest upon the actuating cams, preferably, slide through sleeves 56 into the hollow ends of the nipples 53 so as to impinge against said nipples for moving the actuating rods. The sleeves 56 are, preferably, supported by the main engine housing 3′ as by threading the sleeves into the engine housing.

In the modification of the invention illustrated in Figs. 5 to 11, instead of one valve controlling the exhaust of the exploded charge and the intake and exhaust of the cooling air, separate valves are provided for the intake of the cooling air and the exhaust of the products of combustion and of the cooling air. The three valves for a cylinder of the engine are shown at 60, 61 and 62, these valves being respectively the gas intake valve, the gas and air exhaust valve and the cooling air intake valve. The valves open into the explosion chamber of the cylinder and the valve casings of valves 60 communicate through pipe 63 with a header 64 to which the combustible mixture is supplied in usual manner. The valve casings of valves 61, preferably, communicate with radial pipes 65 leading to a header 66 from which the exhaust gases are discharged to the atmosphere in any well known manner.

The valve casings of valves 62, preferably, communicate with a header 67. This header, preferably, opens through a port 68 to the space within the engine housing, and this space is, preferably, in communication through an opening 69 with the space surrounding the cylinders of the engine. The air thus admitted to the engine cylinders by valves 62 is drawn from the atmosphere by the suction of the fan of the engine past the fins 70 formed upon the engine cylinders, and a part of the air then passes through the space 7 between the jacket 5′ and the engine housing 3′, and the remainder of the air is drawn through apertures 69 and 68 into header 67 from whence it is discharged past valves 62 into the engine cylinders. By this arrangement the same currents of air are arranged to cool both the exterior and the interior of the engine cylinders.

The valves 60, 61 and 62 are, preferably, arranged lengthwise of the axis of the engine, and the actuating rods for these different valves of the respective series of cylinders A and B are adapted to be each controlled by a separate cam upon sleeve 14. Thus six cams are provided upon the sleeve 14, alternate cams 71, 73 and 75 controlling the valves 60, 61 and 62 of the A series of cylinders, and alternate cams 72, 74 and 76 controlling the valves 60, 61 and 62 of the B series of cylinders.

The cam 71 is provided with a cam surface 71′ extending around approximately one-sixth of the periphery of the cam so that the intake valves 60 controlled thereby will open only during one of the six strokes comprising a cycle of operation to form the gas intake stroke. The cam 73 is provided with two cam surfaces 73′ each extending around approximately one-sixth of the periphery of the cam so as to each cause valves 61 to remain open during one stroke of the pistons. The cam surfaces 73′ are so arranged relative to cam surface 71′ as to permit of two strokes of the pistons between the closing of the intake valve and the first opening of the exhaust valve, these two strokes being the compression stroke and the firing stroke respectively. The second opening of the exhaust valve during a cycle of operation caused by the second of the cam surfaces 73′ will occur at the second stroke of the pistons after the first opening of the exhaust valve, since the second cam surface 73′ is spaced beyond the first cam surface 73′ a distance of approximately one-sixth of the periphery of the cam. By this arrangement it will be seen that the exhaust valve will open during the fourth and sixth strokes of a cycle of operation for exhausting the products of combustion and the cooling air respectively.

The cam 75 is provided with a cam surface 75′ arranged to cause opening of valves 62 during one stroke of the pistons. This cam surface is so positioned as to open valves 62 during the stroke of the pistons between the strokes during which valves 61 are open. By this arrangement it will be seen that during the fifth stroke of a cycle of operation after the exhaust products of combustion have been exhausted through valves 61 during the fourth stroke, air will be sucked into the cylinders past valves 62, this air being exhausted during the sixth stroke when the valves 61 are open, as previously described.

Cams 72, 74 and 76 are provided with cam surfaces 72', 74' and 76' similar to cam surfaces 71', 73' and 75' for controlling the valves of the B series of cylinders. The cam surfaces of these latter cams are, preferably, arranged diametrically opposite the same cam surfaces of cams 71, 73 and 75. By this arrangement the cylinders of the A and B series will be alternately fired and the explosion will successively occur at approximately diametrically opposite sides of the axis of the drive shaft 1.

The construction, as thus described, provides efficient means for controlling the valves for the cylinders of an engine working upon the six stroke cycle.

Various changes may be made without departing from the spirit of the invention as claimed,

What is claimed is:

1. An internal combustion engine comprising a drive shaft, cylinders around said shaft, a sleeve on said shaft, and internal gear fixed to said sleeve and surrounding said drive shaft, a pinion on said drive shaft, an idler gear between said pinion and said internal gear, said gearing being arranged to reversely rotate said sleeve with respect to the drive shaft and at a speed less than that of the drive shaft, members on said sleeve, and valves for the respective cylinders controlled by said members.

2. An internal combustion engine including a drive shaft, cylinders around said drive shaft and parallel thereto, a sleeve on said drive shaft, an internal gear fixed to said sleeve and surrounding said drive shaft, a pinion on said drive shaft, an idler gear between said pinion and said internal gear, said gearing being arranged to reversely rotate said sleeve with respect to said drive shaft and at one-third of the speed thereof, cams on said sleeve, and valves for the respective engine cylinders controlled by said cams and providing a six stroke cycle of operation for the engine.

3. An internal combustion engine including a drive shaft, cylinders around said drive shaft and parallel thereto, a combustible mixture intake valve for the respective cylinders, a second valve for the respective cylinders communicating with the atmosphere, controlling means for said valves forming a six strike cycle of operation in the engine, said controlling means comprising a cam on the drive shaft for successively opening the intake valve of the respective cylinders to form the intake stroke of the cycle of operation of the engine, and a second cam on said drive shaft controlling the second mentioned valve for the respective cylinders, said cam being arranged to successively open said second valves of the respective engine cylinders during the fourth, fifth and sixth strokes of the cycle of operation of the engine to provide an exhaust stroke for the products of combustion, an air intake stroke and an air exhaust stroke.

4. An internal combustion engine including a drive shaft, cylinders around said drive shaft and parallel thereto, a combustible mixture intake valve for the respective cylinders, a second valve for the respective cylinders communicating with the atmosphere, said cylinders and their valves being arranged in a plurality of sets, controlling means for the respective sets of valves forming a six stroke cycle of operation for the engine, said controlling means for each set including a cam on the drive shaft for successively opening the intake valve of the respective cylinders to form the intake stroke of the cycle of operation of the engine, and a second cam on said drive shaft controlling the second mentioned valve for the respective cylinders, said cam being arranged to successively open said second valves of the respective engine cylinders during the fourth, fifth and sixth strokes of the cycle of operation of the engine to provide an exhaust stroke for the products of combustion, an air intake stroke and an air exhaust stroke.

5. An internal combustion engine including a drive shaft, cylinders, a sleeve on said drive shaft, an internal gear fixed to said sleeve and surrounding said drive shaft, a pinion on said drive shaft, an idler gear between said pinion and said internal gear, said gearing being arranged to reversely rotate said sleeve with respect to said drive shaft, cams on said sleeve, and valves for the respective engine cylinders controlled by said cams.

6. An internal combustion engine including a drive shaft, cylinders, a combustible mixture intake valve for the respective cylinders, a second valve for the respective cylinders communicating with the atmosphere, controlling means for said valves forming a six stroke cycle of operation in the engine and arranged to successively open the intake valve of the respective cylinders to form the intake stroke of the cycle of operation of the engine, and to successively open said second valves of the respective engine cylinders during the fourth, fifth and sixth strokes of the cycle of operation of the engine to provide an exhaust stroke for the products of combustion, an air intake stroke and an air exhaust stroke.

7. An internal combustion engine includin a drive shaft, cylinders, a combustible mixture intake valve for the respective cylinders, a second valve for the respective cylinders communicating with the atmosphere, said cylinders and their valves being arranged in a plurality of sets, controlling means for the respective sets of valves forming a six stroke cycle of operation for the engine and arranged for successively opening the intake valve of the respective cylinders to form the intake stroke of the cycle of operation of the engine, and to successively open said second valves of the respective engine cylinders during the fourth, fifth and sixth strokes of the cycle of operation of the engine to provide an exhaust stroke for the products of combustion, an air intake stroke and an air exhaust stroke.

In testimony whereof we have signed our names to this specification.

EVERETT R. BURTNETT.
TITUS E. BERRY.